Jan. 10, 1967  A. ZWOLSKI  3,297,888
ELECTROSTATIC MOTOR
Filed Sept. 23, 1963
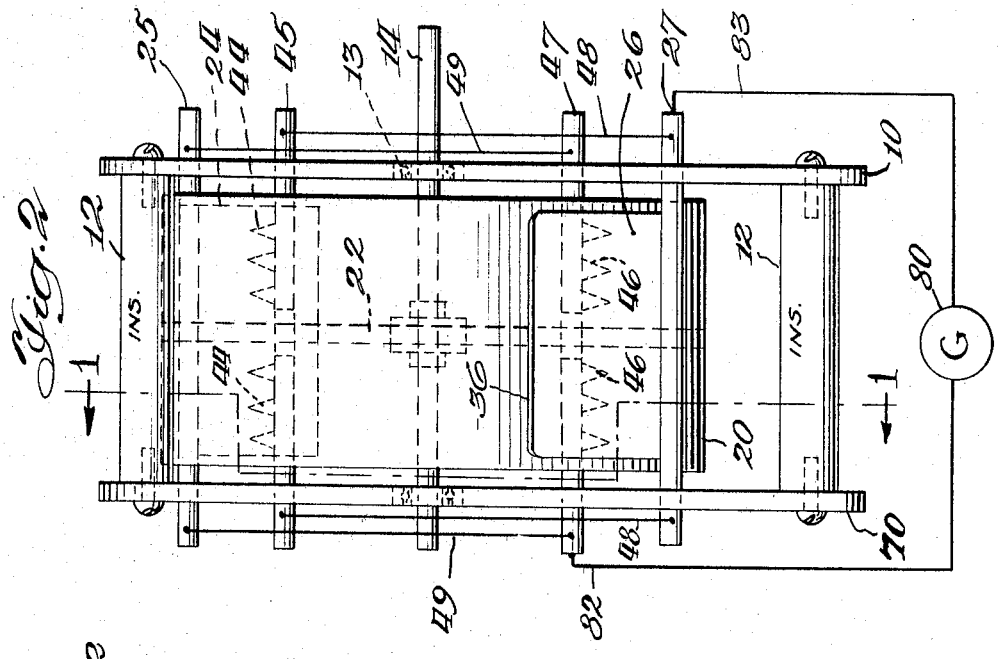
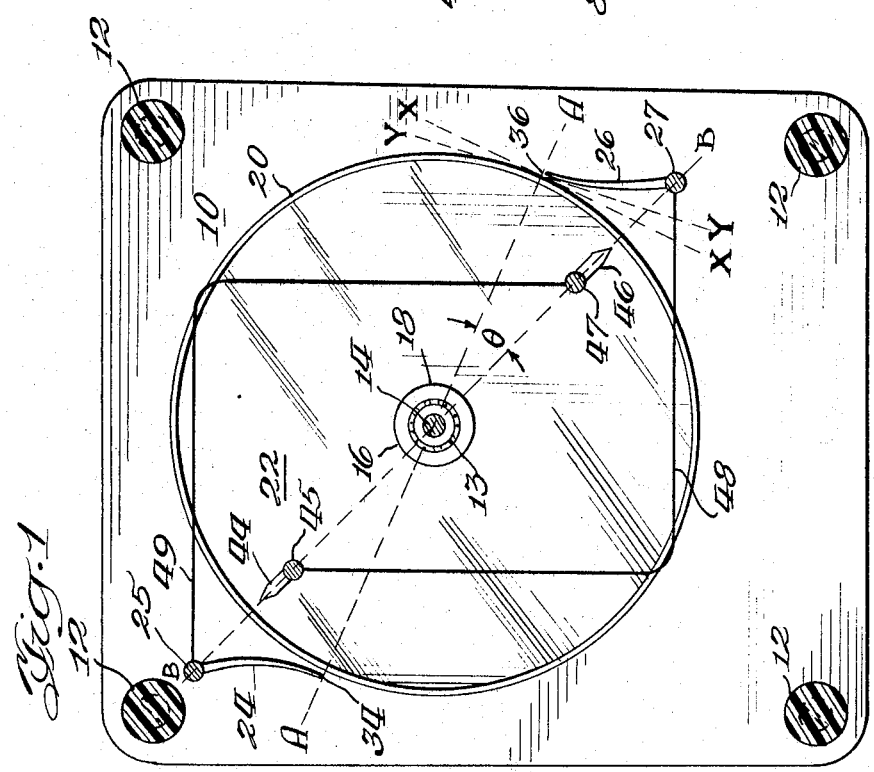
Inventor
Anthony Zwolski
By Silverman, Mullin, Cass & Kaufman
Attorneys

3,297,888
ELECTROSTATIC MOTOR
Anthony Zwolski, 1848 W. 18th St., Chicago, Ill. 60608
Filed Sept. 23, 1963, Ser. No. 310,672
1 Claim. (Cl. 310—6)

This invention relates to electrostatic motors and more particularly to an electrostatically driven motor of simple and economic construction.

The objects of the present invention include elimination of waste by current flow through a conductive armature, and to provide an electric motor driven by electrostatic force.

Further objects and advantages of the invention will become apparent as the description proceeds.

In the accompanying drawing:

FIGURE 1 is a sectional view on line 1—1 of FIGURE 2 of an electrostatic motor according to the invention, illustrating diagrammatically a portion of the electrical connections therein; and FIGURE 2 is an elevation of the motor of FIGURE 1 with diagrammatic electrical circuits indicated.

In the embodiment of the invention selected for illustration, the motor comprises a hollow cylindrical armature member 20 fixed to a central axle shaft 14 and mounted for rotation therewith in suitable bearings 13 in mounting end plates 70, 10. The armature 20 is of glass, or any one of the many well-known plastic materials having high dielectric or electric resistance qualities. It is fixed to a central drive shaft 14 by means of an interior mounting disc 22 of insulating material.

Pointed interior electrodes 44 and 46 are positioned within the armature 20 spaced from the interior surface thereof and toward opposite ends of a first diameter B—B of the armature. Exterior electrodes 24 and 26 are similarly positioned in spaced apart relation with the exterior armature surface toward opposite ends of a second armature diameter A—A angularly displaced from the first diameter. The exterior electrodes 24 and 26 are broad curved metal sheets, mounted substantially in tangential, though spaced apart, relation with the exterior armature surface at the ends 34 and 36 of the two exterior electrodes.

That is, these exterior electrodes 24 and 26 define a very small angle with a plane which is tangent to the armature surface. The exterior electrode edges at 34 and 36 are sharply terminated.

A source of high voltage electricity G, 80 is connected in the circuit between the two outer electrodes 44 and 46 and between each of the two pairs of adjacent inner and outer electrodes 44 and 24, and 46 and 26. When a high voltage is applied from the source G 80, electrostatic charges of one polarity are generated at one position near electrode 46 on the inner surface of the armature. This is accompanied by ionization of the atmosphere between the inner electrode 46 and the inner armature surface. Thus this charged inner armature portion is drawn by electrostatic attractive force toward the angularly displaced, oppositely charged, companion outer electrode 26. Rotation of the armature and the associated drive shaft 14 ensues.

At the other inner electrode 44, a complementary charging and electrostatic driving takes place. At the sharp edge portions 34 and 36 of the outer electrodes 24 and 26, a very high electrostatic field gradient is maintained, which ionizes the air intervening between the electrodes and the outer armature surface. Thus, opposite charges are generated on the outer armature surface to neutralize previous charges.

Since the electrodes of each inner and outer pair are of opposite polarity, on each half revolution of the armature residual charges are erased by the spray of opposite charges from the next electrode. Hence no cumulative charge occurs on either the inner or the outer armature surface.

Referring to FIGURE 1, the mounting end plates 10 and 70 have four cylindrical mounting columns 12. The end plates 70 and 10 are constructed of insulating material, for example, of Bakelite. The mounting columns 12 are similarly constructed of Bakelite.

Exterior electrode mounting posts 25 and 27 are also mounted in the end plates 70 and 10. These mounting posts serve for mounting the sheet metal curved exterior electrodes 24 and 26. These curved electrodes 24 and 26 are sharpened at 34 and 36, to ensure concentration of the electrical field gradients at the edge of the outer electrode. These outer electrodes 24 and 26 are curved, to make a very small angle with a tangent to the armature surface i.e., to be substantially tangential to and slightly spaced apart from the outer surface of the armature 20. The above noted, very small angle is indicated by the dash lines X—X and Y—Y. The armature is fixed to the axle member 14 by a transparent plastic connecting disc 22 and a mounting boss 16. The axle member 14, in turn, is mounted for rotation in the end plates 70 and 10.

The outer electrodes are so configured and disposed as to be substantially tangential, that is, as we have noted, to make a very small angle, at end portions thereof, to the armature 20 at points toward the opposite ends of a diameter of the armature 20, as indicated by the dash line A—A.

The pointed inner electrodes 44, 46 are mounted on posts 45 and 47, in spaced apart relation with the inner surface of the armature 20 toward the ends of a diametric line B—B. The posts 45 and 47 are fixed to end plates 70 and 10, as shown in FIGURE 2.

The electrodes 24 and 26 are connected together by leads 49 and the electrodes 44 and 26 are connected together by leads 48. Thus, each of the inner electrodes 44 and 46 is paired, for electrical potential purposes, with an oppositely positioned outer electrode, and the inner electrodes themselves are electrically spaced apart, as they are geometrically remote. It will be noted that the diametric lines A—A and B—B of electrode disposition are angularly displaced by an angle $\theta$. This displacement angle is chosen to be less than a right angle in accordance with the operating parameters applicable to driving of the motor shown in the drawing. As appears from the description of FIGURE 2, a potential source G 80 applies an electrical potential between leads 48 and 49.

The generator 80 of FIGURE 2 is any convenient high voltage generator of a well-known type. This generator 80 is connected by way of leads 82 and 83 to conductive metal posts 47 and 27 respectively. These posts in turn are conductively connected to the conductive electrode mounting posts 25 and 45 by leads 49 and 48 respectively. The two mounting end plates 70 and 10 are shown in assembled relation, spaced apart by columns 12, for rotatably supporting the axle 14. As appears in the dashed portion of this figure, each end plate includes a well-known suitable bearing 12 for rotatably supporting the axle 14. Typically, this supporting portion of the end walls 10 and 70 is a ball bearing 13 of conventional construction.

I believe the foregoing explanation of why and how the motor operates to be correct, but if the explanation is erroneous, the fact remains that the structure disclosed does operate reliably, and rotates its armature rapidly.

Others may readily adapt the invention for use under various conditions of service by employing one or more of the novel features disclosed, or equivalents thereof. As at present advised, with respect to the apparent scope of my invention, I desire to claim the following subject matter:

An electrostatic motor comprising, in combination: an outer pair of separated conductive electrodes; a rotatable tubular dielectric armature between said electrodes; said armature having outer and inner coaxial surfaces of revolution; each outer electrode having a discharge portion closely adjacent the outer surface of said armature and spaced diametrically apart, and a face portion extending away from said discharge portion at a diverging angle with respect to the approaching armature surface; the angle of divergence being less than ninety degrees; whereby the armature surface approaching said electrode may be attracted electrostatically in a diagonally forward direction by the potential field around said diverging electrode surface; an inner companion electrode for each outer electrode; each inner companion electrode having a discharge portion closely adjacent the inner surface of said armature, said inner electrodes being spaced diametrically apart, and a face portion diverging from the approaching armature surface at an angle of not more than ninety degrees; each inner electrode being circumferentially offset from its outer companion by an angle less than ninety degrees; said discharge portions of companion electrodes being angularly displaced at an angle of less than ninety degrees, a potential source; connections from said source for delivering positive potential to one of said outer electrodes and negative potential to the other; and connections for delivering to each inner electrode potential opposite to that received by its companion outer electrode; said source being of sufficient potential to cause ionization along the discharge portions of all said electrodes.

References Cited by the Examiner

UNITED STATES PATENTS

| | | | |
|---|---|---|---|
| 2,836,785 | 5/1958 | Neubert | 310—6 |
| 2,860,264 | 11/1958 | Felici | 310—6 |

MILTON O. HIRSHFIELD, *Primary Examiner.*

J. W. GIBBS, *Assistant Examiner.*